United States Patent [19]

Pond

[11] Patent Number: 4,835,898
[45] Date of Patent: Jun. 6, 1989

[54] FISH HOOK CONSTRUCTION

[75] Inventor: Robert B. Pond, South Attleboro, Mass.

[73] Assignee: Atom Mfg. Co., Inc., South Attleboro, Mass.

[21] Appl. No.: 200,044

[22] Filed: May 31, 1988

[51] Int. Cl.⁴ ............................................. A01K 83/00
[52] U.S. Cl. ..................................... 43/43.16; 43/43.1
[58] Field of Search ..................... 43/43.16, 5, 6, 42.7, 43/43.1

[56] References Cited

U.S. PATENT DOCUMENTS

| 1,706,881 | 3/1929 | Hampson | 43/43.16 |
| 2,101,491 | 12/1937 | Chilcott | 43/43.16 |
| 3,023,536 | 3/1962 | Williams | 43/43.16 |
| 3,435,553 | 4/1969 | Conley | 43/43.16 |
| 4,214,398 | 7/1980 | Campbell et al. | 43/43.16 |

FOREIGN PATENT DOCUMENTS

| 10056 | of 1904 | United Kingdom | 43/43.16 |
| 202923 | 8/1923 | United Kingdom | 43/43.16 |

*Primary Examiner*—Nicholas P. Godici
*Assistant Examiner*—William Scott Andes
*Attorney, Agent, or Firm*—Salter & Michaelson

[57] ABSTRACT

A fish hook includes integrally connected hook, shank and eyelet portions which are formed to both increase fish catching efficiency and to minimize damage to hooked fish so that fish can normally be released essentialy unharmed. The eyelet portion is substantially aligned with the tip of the hook portion so that the tip can more effectively penetrate the jaw structures of fish, and the shank is bent outwardly from the hook portion to provide clearance around the jaw structures of fish. The overall construction of the hook and shank portions normally prevents the hook from passing into the inner mouth areas of fish in order to avoid causing serious damage to the fish.

8 Claims, 1 Drawing Sheet

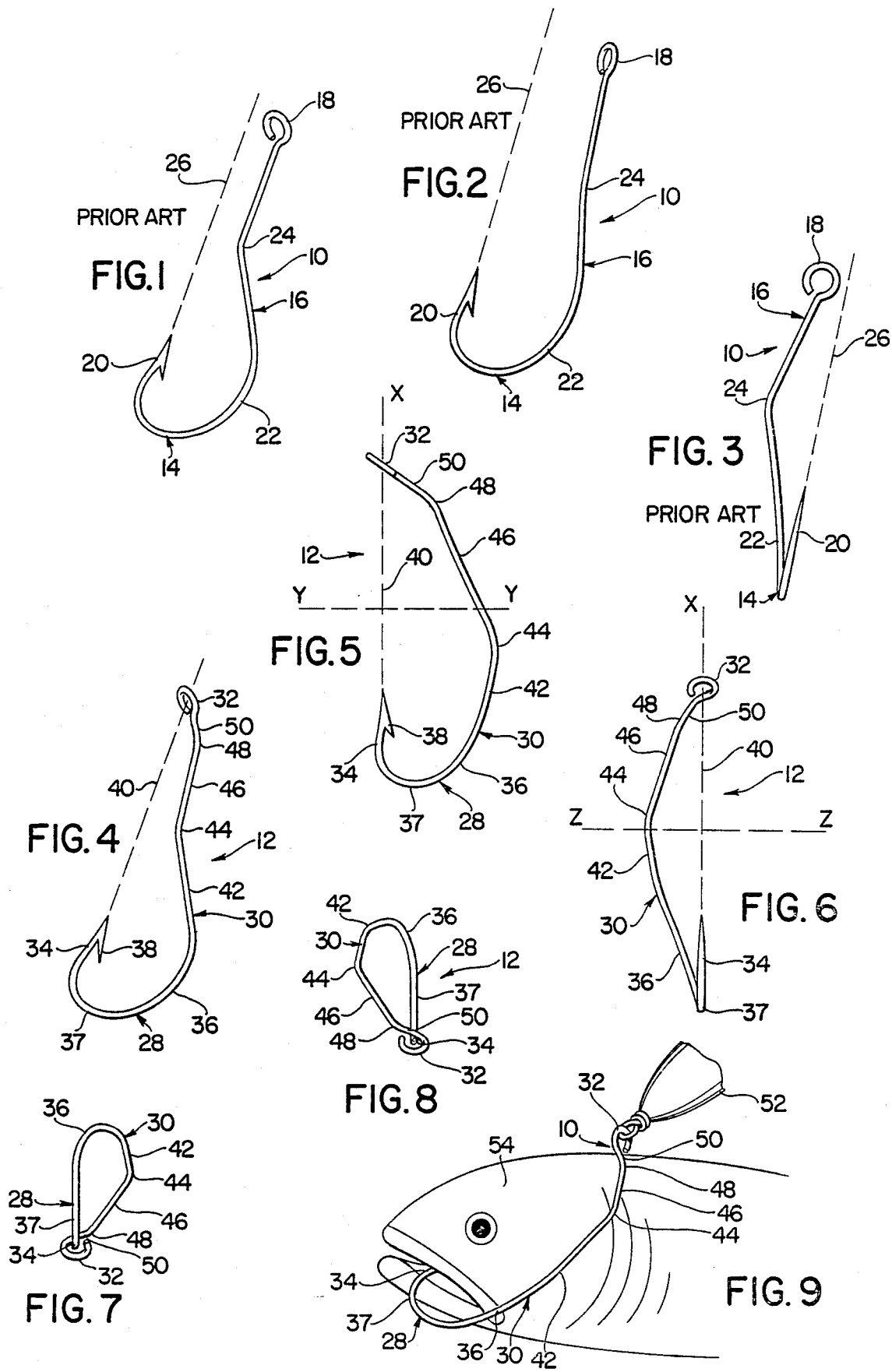

FISH HOOK CONSTRUCTION

BACKGROUND AND SUMMARY OF THE INVENTION

The instant invention relates to fishing tackle and more particularly to an improved fish hook construction.

Over the years it has been found that conventional fish hooks of the type which include a U-shaped hook portion having a pointed tip at one end thereof, a substantially straight shank portion which extends from the U-shaped hook portion, and an eyelet portion on the end of the shank portion have certain disadvantages. In particular, it has been found that when fish hooks of this type are utilized in certain specific applications, such as when they are incorporated in trolling or casting plugs, they are often ineffective for securely and quickly hooking the jaws of fish which attack the plugs. In this connection, it has been found that in most instances, when game fish attack live bait, they initially hold the bait in their jaws and then move away from the point of capture to reposition the bait so that it can be swallowed head first. Hence, when game fish attack plugs having conventional hooks, the hooks often remain unset for sufficiently long periods of time to enable the fish to expel the plugs and escape. Further, it has been found that in instances where fish are not able to expel plugs, the fish often become snagged in the facial areas thereof, and are irreparably damaged, to the extent that they cannot be released. Further, while attempts have been made to increase the efficiency of many types of artificial plugs by utilizing treble hooks instead of conventional single hooks, it has been found that treble hooks also frequently cause sufficient damage to fish to prevent their eventual release and that treble hooks can be hazardous to anglers as well. In addition, while other types of single fish hooks have been heretofore available which have comprised bent shank portions, including the fish hook disclosed in the U.S. patent to Campbell et al U.S. Pat. No. 4,214,398, and various other types of bent hooks, the heretofore available hooks have not been both outwardly bent to provide clearance for the jaw structures of fish and to provide substantially direct alignment between the eyelet portions thereof and the tip portions thereof. Hence, virtually all of the heretofore available fish hooks have had disadvantages which have made them less than entirely effective for use in connection with fishing plugs.

The instant invention provides an improved fish hook construction which can be utilized in connection with various types of fishing plugs for hooking and catching fish with substantially increased levels of efficiency. The fish hook construction of the instant invention can be utilized in combination with many types of conventional fishing plugs, and it comprises integrally formed hook, shank, and eyelet portions which are adapted to increase the efficiency of the hook portion for quickly penetrating the jaw structure of a fish when the fish releases a fishing plug to which the hook is attached. The hook portion is of generally U-shaped configuration, and it includes a pointed tip portion, a connected end portion, and an intermediate or bend portion therebetween, and the tip portion extends in an X direction and defines an axis of the hook. The tip portion and the intermediate portion are disposed predominantly in an X-Y plane, and the connected end portion preferably angles outwardly slightly from the plane of the tip portion and the intermediate portion in a Z direction so that the tip portion is actually angularly offset slightly. Accordingly, the connected end portion of the hook portion is spaced outwardly from the axis of the hook in the Y direction, and it preferably angles outwardly slightly in the Z direction. The eyelet portion is substantially aligned with the axis of the hook, but it is obviously spaced from the tip portion in the X direction. The hook is preferably further formed so that the shank portion extends outwardly from the connected end portion of the hook portion to a point which is spaced outwardly from the connected end portion in both the Y direction and the Z direction, and so that the shank portion thereafter extends back inwardly to the eyelet portion. In this regard, the shank portion preferably extends outwardly from the connected end portion of the hook portion to a point which is spaced outwardly from the connected end portion in the Z direction by a distance which is at least half of the distance between the connected end portion and the tip portion of the hook in the Y direction. As illustrated in FIGS. 5 and 6, this same point is preferably spaced outwardly in the Y direction by a distance which is at least half of the distance between the connected end portion and the tip portion in the Y direction. Further, the hook is preferably formed so that the eyelet portion faces at least partially towards the tip portion.

It has been found that the hook of the instant invention can be effectively utilized in connection with a fishing plug for both hooking and catching most types of game fish with substantially increased levels of efficiency. In particular, it has been found that because the pointed tip portion and the eyelet portion of the hook of the instant invention are substantially aligned along a common axis, a force applied to the hook by a fishing line is normally substantially aligned with the tip portion. As a result, the tip portion is normally drawn more directly toward the fishing line so that under most circumstances it more efficiently engages and penetrates the jaw structure of a fish. In addition, because the tip portion is directly aligned with the eyelet portion, the tip portion is, in effect, protected by the eyelet portion so that the tip portion normally remains unset while the plug is in the fish's mouth. However, as the fish opens its mouth to reposition the plug therein, the curvature of the shank portion and the alignment of the tip portion with the eyelet portion cause the eyelet portion and the shank portion to slide around the jaw structure of the fish and lead the tip portion into penetrating engagement with the jaw structure. Further, the offset configuration of the tip portion causes the tip portion to rotate slightly so that it still more effectively penetrates the fish's jaw structure. Still further, it has been found that the outwardly bent configurations of the connected end portion of the hook portion and the shank portion provide clearance around the jaw structure of a fish to assure that the tip portion is effectively engageable with the inner jaw structure of the fish when a force is applied to the eyelet portion, although the main purpose for the bends in the shank portion is to bring the eyelet portion into alignment with the angularly offset tip portion. As a result, the hook of the instant invention is engageable with the jaw structure of a fish in a substantially more efficient and effective manner so that in most cases it is firmly set before it can be expelled by the fish. Further, the hook of the instant invention is substantially less likely to be caught in the back of the mouth since the bends shield the point until it passes over the jaw structure. Accordingly, the fish hook of the instant invention not only enhances the effectiveness of the overall fishing process, but it also permits unwanted game fish to be released with only minimal damage.

As a result of the above, it is a primary object of the instant invention to provide a fish hook which is operative with an increased level of efficiency for hooking the inner jaw structure of a fish.

Another object of the instant invention is to provide a fish hook having an outwardly bent shank portion which provides clearance to assure that the tip portion of the hook is effectively engageable with the jaw structure of a fish.

An even further object of the instant invention is to provide a fish hook which can normally be effectively and efficiently utilized for hooking and catching game fish without causing significant permanent damage thereto.

Other objects, features and advantages of the invention shall become apparent as the description thereof proceeds when considered in connection with the accompanying illustrative drawings.

DESCRIPTION OF THE DRAWINGS

In the drawing which illustrates the best mode presently contemplated for carrying out the present invention:

FIG. 1 is a perspective view of a fish hook of the prior art;

FIG. 2 is a side elevational view thereof;

FIG. 3 is a front elevational view thereof;

FIG. 4 is a perspective view of the fish hook of the instant invention;

FIG. 5 is a side elevational view thereof;

FIG. 6 is a front elevational view thereof;

FIG. 7 is an end view of the fish hook as viewed from the hook portion end;

FIG. 8 is an end view thereof as viewed from the eyelet end; and

FIG. 9 is a perspective view illustrating the operation of the fish hook for hooking a fish.

DESCRIPTION OF THE INVENTION

Referring now to the drawing, a fish hook representing the closest prior art to the instant invention of which the applicant is aware is illustrated in FIGS. 1 through 3 and generally indicated at 10, and the fish hook of the instant invention is illustrated in FIGS. 4 through 9 and generally indicated at 12. In this connection, it has been found that the fish hook of the instant invention is substantially more efficient and effective for hooking and catching most types of game fish than either the prior art hook 10 or other conventional types of fish hooks which include substantially straight shank portions, and that therefore the fish hook 12 has significant advantages over the heretofore available fish hooks, as will hereinafter be more fully set forth.

The prior art fish hook 12 comprises hook and shank portions generally indicated at 14 and 16, respectively, and an eyelet portion 18, all of which are normally integrally formed from a suitable rigid metal, such as steel or stainless steel. The hook portion 14 includes tip and connected end portions 20 and 22, respectively, which are substantially disposed in a common plane, as illustrated in FIG. 3. The shank portion 16 is bent outwardly from the plane of the hook portion 14 to a bend 24 and then back to the plane of the hook portion 14 where it merges with the eyelet portion 18, although the eyelet portion 18 is actually disposed in transverse relation to the plane of the hook portion 14. However, as illustrated most clearly in FIGS. 2 and 3, the shank portion 16 is only bent outwardly in a single direction from the connected end portion 22. Further, the tip portion 20 extends along an axis 26 which is offset substantially from the eyelet portion 18 so that a force applied to the eyelet portion 18 by a fishing line cannot effectively urge the tip portion 20 along the direction of the axis 26.

Referring now to FIGS. 4 through 8, the hook 12 of the instant invention comprises hook and shank portions generally indicated at 28 and 30, respectively and an eyelet portion 32, all of which are preferably integrally formed from a suitable durable metal, such as steel or stainless steel. The hook portion 28 is of generally U-shaped configuration, and it comprises spaced tip and connected end portions 34 and 36, respectively, and an intermediate or bend portion 37 therebetween. The tip portion 34 preferably includes a barb 38, and it defines an axis 40 of the hook 12 which extends in an X spatial direction. The eyelet portion 32 is substantially aligned with the axis 40, and it preferably faces at least partially toward the tip portion 34. Further, the tip portion 34 and the intermediate portion 37 lie predominantly in an X-Y plane, and the connected end portion 36 preferably extends at a slight acute angle to the X-Y plane of the tip portion 34 and the intermediate portion 37, as illustrated in FIG. 6. The shank portion 30 includes a first portion 42 which extends outwardly from the connected end portion 36 to a first point 44 which is spaced outwardly from the connected end portion 36 in both a Y spatial direction and a Z spatial direction. The first point 44 is preferably spaced outwardly from the connected end portion 36 in the Z direction by an amount which is at least approximately half of the distance in the Y direction between the connected end portion 36 and the axis 40 in order to achieve the desired outwardly bent configuration in the shank portion 30. The shank portion 30 further includes a second portion 46 which extends inwardly from the first point 44 toward the eyelet portion 32 and the axis 40 to a second point 48 and a third portion 50 which extends inwardly from the second point 48 toward the axis 40 at a slightly sharper angle and merges with the eyelet portion 32.

In use, the hook 12 is preferably assembled in a fishing plug 52 so that a force applied to a leader or fishing line connected to the plug 52 applies a force to the eyelet portion 32 which is substantially aligned with the axis 40. Accordingly, as a pulling force is applied to the hook 12 by the plug 52, the tip portion 34 is urged in the X direction along the axis 40 despite the outwardly bent configuration of the shank portion 30 and the angularly offset configuration of the tip portion 34. As a result, as illustrated in FIG. 9, when the plug 52 is attacked by a fish 54 and the fish 54 thereafter releases the plug 52 to reposition it in its mouth, the eyelet and shank portions 30 and 32, respectively, slide around the jaw structure of the fish 54 as the plug 52 leaves the fish's mouth, and the tip portion 34 is drawn or led into penetrating engagement with the jaw structure. Further, a direct force is effectively applied to the tip portion 34 in order to firmly set the hook 12 in the jaw of the fish 54. However, because the hook 12 is adapted to apply a direct force to the tip portion 34, the tip portion 34 is actually shielded somewhat by the eyelet portion 32 so that it normally does not damage the fish 54 by snagging it while the plug 52 is in the fish's mouth. As a result, in most instances fish, such as the fish 54, can be released essentially unharmed after they have been caught with the hook 12.

It is seen, therefore, that the instant invention represents a significance advancement in the art of fishing tackle. Specifically, the hook 12 is adapted so that it is substantially more effective and efficient for hooking the jaw structures of fish in a manner which enables the fish to be released essentially unharmed. Accordingly, it is seen that the fish hook of the instant invention has significant advantages over the heretofore available fish hooks and that it therefore has significant commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A fish hook comprising integrally formed hook, shank and eyelet portions, said hook portion being of generally U-shaped configuration and including a pointed tip portion, a connected end portion and a bend portion therebetween, said pointed tip portion extending n an X direction which defines an axis of said hook, said connected end portion being spaced outwardly from said axis in a Y direction, said tip portion and said bend portion being disposed predominantly in an X-Y plane, said eyelet portion being substantially aligned with said axis, said shank portion extending outwardly from said connected end portion to a point which is spaced outwardly from said connected end portion in both said Y direction and in a Z direction and thereafter extending back inwardly to said eyelet portion.

2. In the fish hook of claim 1, said shank portion extending outwardly from said connected end portion to a point which is spaced outwardly slightly from said connected end portion in said Z direction.

3. In the fish hook of claim 1, said connected end portion being connected to said shank portion at a point which is spaced from said axis in both said Y direction and said Z direction.

4. In the fish hook of claim 1, said tip portion and said bend portion lying substantially in said X-Y plane, said connected end portion extending outwardly at an acute angle to said X-Y plane.

5. In the fish hook of claim 1, said eyelet portion facing at least partially toward said tip portion.

6. In the fish hook of claim 1, said connected end portion being spaced outwardly from said tip portion in said Y direction by a first predetermined distance, said shank portion extending outwardly from said connected end portion to a point which is spaced outwardly from said connected end portion in said Z direction by a second predetermined distance, said second predetermined distance being at least approximately half of said first predetermined distance.

7. In the fish hook of claim 6, said shank portion extending outwardly from said connected end portion to a point which is spaced outwardly from said connected end portion in said Y direction by a distance which is at least approximately half of said first predetermined distance.

8. In the fish hook of claim 1, said connected end portion being spaced outwardly from said tip portion in said Y direction by a predetermined distance, said shank portion extending outwardly from said connected end portion to a point which is spaced outwardly from said connected portion in said Y direction by a distance which is at least half of said predetermined distance.

* * * * *